United States Patent [19]

Newton, Jr.

[11] 3,824,433

[45] July 16, 1974

[54] UNIVERSAL CIRCUIT BOARD

[75] Inventor: William H. Newton, Jr., Houston, Tex.

[73] Assignee: Thunderco, Inc., Houston, Tex.

[22] Filed: Mar. 5, 1973

[21] Appl. No.: 338,134

[52] U.S. Cl. .............. 317/101 CE, 29/625, 29/626, 174/68.5, 317/101 B, 317/101 CM, 339/18 C

[51] Int. Cl. .......................... H05k 1/14, H05k 1/18

[58] Field of Search ............ 174/68.5; 317/101 CE; 339/112, 18 R, 18 C, 18 B, 19; 35/19 A; 29/625, 626

[56] References Cited

UNITED STATES PATENTS 473,848 4/1892 Mayer.............................. 317/112

2,932,772 4/1960 Bowman et al.............. 317/101 CE

*Primary Examiner*—Darrell L. Clay

*Attorney, Agent, or Firm*—Michael P. Breston

[57] ABSTRACT

The invention generally concerns two and three-dimensional matrixes programmable for any desired electric network, and the method for making the same. Each matrix includes groups of parallel-spaced, mutually-perpendicular conductors electrically insulated from each other by a dielectric member which is imperforate at the crossover points of the conductors.

7 Claims, 12 Drawing Figures

(INVENTION)

UNIVERSAL CIRCUIT BOARD

BACKGROUND OF THE INVENTION

This invention relates to universal matrixes, one example of which is a double-cladded printed-circuit (P-C) board having universal utility for programming a variety of electric circuit configurations. Such universal P-C boards are useful at various stages of research and development and for small production runs of circuit networks. The need for such P-C boards is well known. With such boards, desirable electrical interconnections from one side of the board to the other can be made on a cross-strip matrix having groups of mutually-perpendicular conductive strips on opposite faces of a dielectric sheet.

Several such universal boards are described in the patent literature. U.S. Pat. No. 3,493,671 describes one such prior art universal P-C board, wherein the dielectric sheet is perforated at the points of superimposition of the cross-strip matrix. Such known universal P-C boards are satisfactory for relatively simple circuit configurations employing a limited number of components. They are not satisfactory however for applications in which it is necesary or desirable to mount a plurality of circuit networks on a single P-C board, each array comprising several electrical componets such as resistors, capacitors, integrated-circuit chips, switches, etc. The arrays are interconnected through terminals positioned at the edge of each P-C board.

The limited capability of such a known universal P-C board stems primarily from the fact that with the perforations at the crossover points only, each electric connection made at a crossover point reults in tying up two conductive strips, thereby limiting the available number of strips for the construction of electric or electronic networks using passive and/or active components.

It is a primary object of this invention to avoid the above mentioned and other apparent prior art limitations.

SUMMARY OF THE INVENTION

The invention generally concerns two and three-dimensional matrixes programmable for any desired electric network and the method for making the same. Each matrix includes groups of parallel-spaced, mutually-perpendicular conductors electrically insulated from each other by a dielectric member which is imperforate at the crossover points of the conductors. In a preferred embodiment of the invention there is provided a universal two-dimensional circuit board having a dielectric board defining a plurality of perforations arranged in a predetermined pattern. A first group of substantially parallel strips is contiguous with one face of the board and a second group of parallel strips is contiguous with the opposite face of the board. The second group is disposed at an angle relative to the first group. Each perforation lies between a pair of adjacent strips on one face and extends through a strip on the opposite face. The method for making such a universal circuit board requires boring a plurality of perforations through a dielectric board, forming groups of mutually perpendicular conductive strips on opposite faces of the board whereby the perforations extend through the board and through conductive strips at points of non-superimposition of the conductive strips. In this fashion, the board and the strips are imperforate at the crossover points of the conductive strips.

BRIEF DESCRIPTION OF THE DRAWINGS

Throughout the drawings the same reference characters are used to designate the same or similar parts. Referring now to FIGS. 1–6, numeral 10 generally designates a universal printed-circuit (P-C) board comprising a flat, dielectric, electrically-nonconductive sheet or board 12. Board 12 is double-cladded. On its upper face 14 are provided conductive strips grouped into four arrays 15–18. The number of arrays is not critical and could be one. Each array has a plurality of parallel-spaced conductive strips 20. Each strip 20 defines a plurality of longitudinally-spaced apart perforations 22, typically of circular configuration. Around each perforation 22, strip 20 is enlarged to form a circular pad 24 (FIG. 3). Strips 20 are desirably placed together as close as component and manufacturing tolerances will permit. One end of each array may be terminated to provide say terminals 1–8 grouped around a square or circular isle 26 adapted to accept a multi-lead active or passive component, as will be readily understood by those skilled in the art. A standard operational amplifier 27 is shown mounted on isle 26 in array 16. For the P-C board 10 to have universal utility, strips 20 must be layed out to accept a wide variety of generally-employed electric components and networks.

Figure 1:
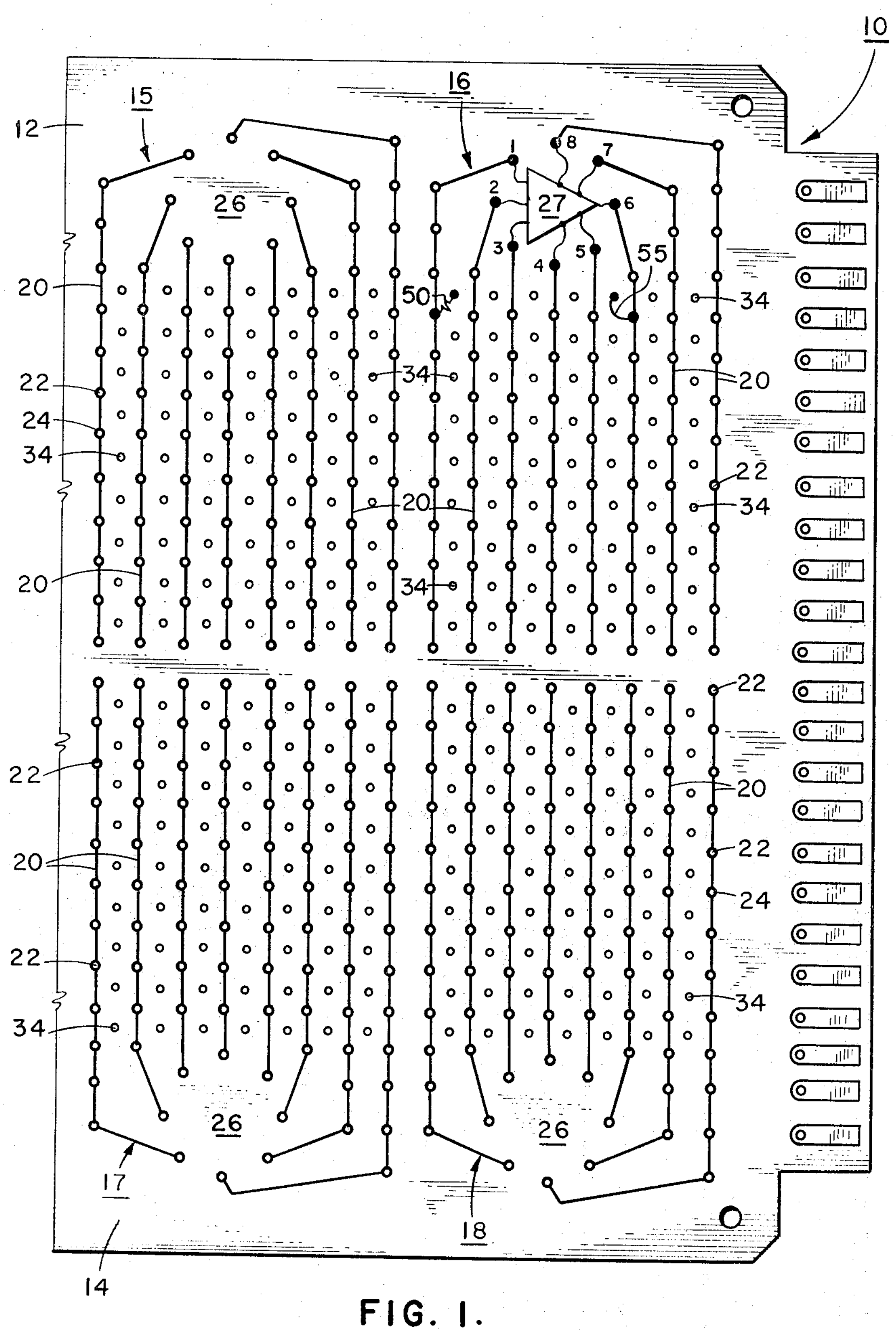
FIG. 1 shows a two-dimensional universal P-C board in accordance with the present invention on which is mounted a standard amplifier.

On the opposite or back face 13 of the dielectric sheet 12 is provided a group 30 of generally parallel-spaced conductive strips 32 at an angle to strips 20 which could be between 45° to 90°. In the preferred embodiment strips 32 are substantially perpendicular to strips 20 on face 14. Thus strips 20 and 32 form a cross-strip matrix. Each conductive strip 32 also defines a plurality of longitudinally spaced-apart perforations 34 and pads 36.

Figures 2, 3:
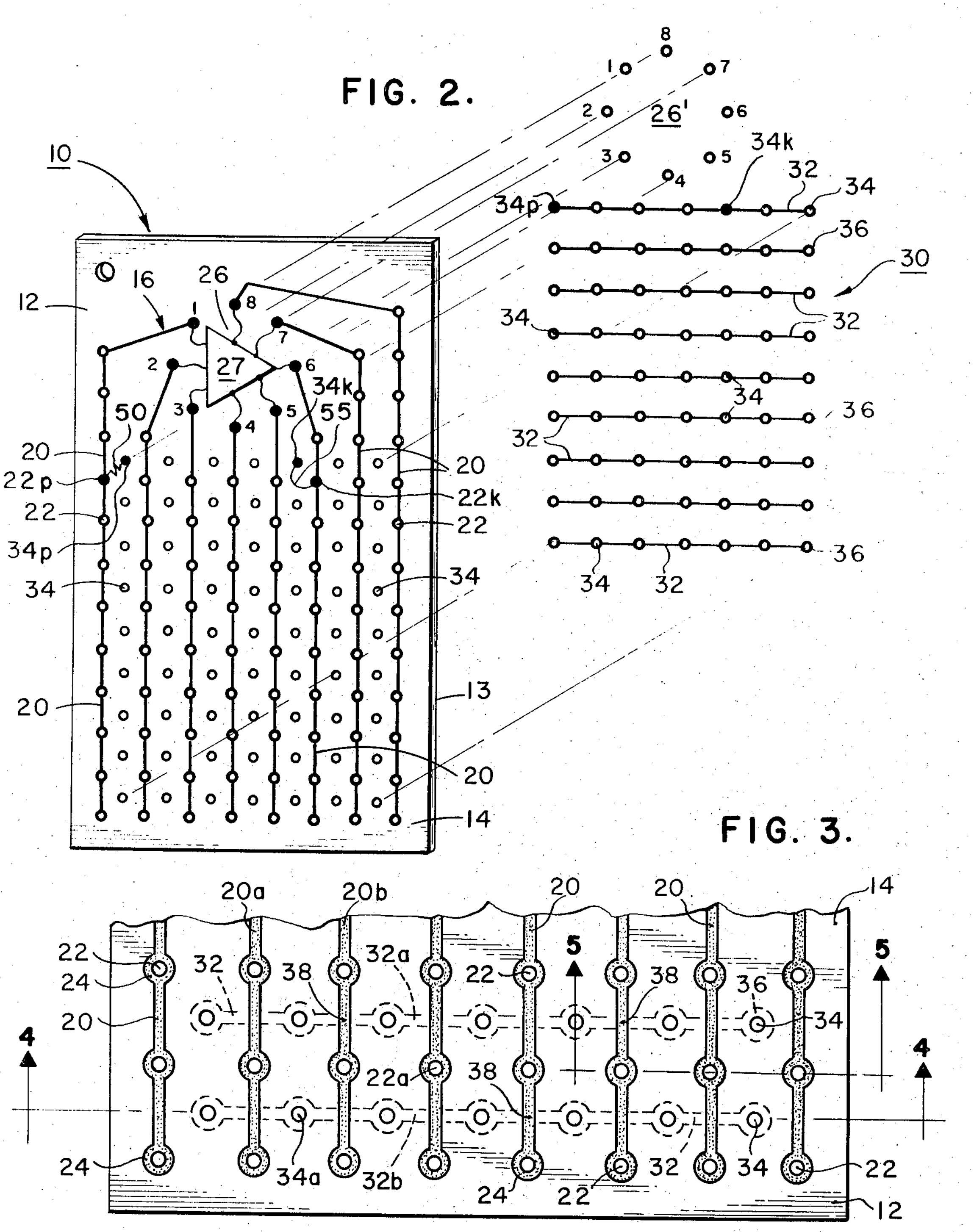
FIG. 2 shows an exploded view of one array on the P-C board of FIG. 1.
FIG. 3 is an enlarged view of a section of the array shown in FIG. 2.
Figures 4, 5:
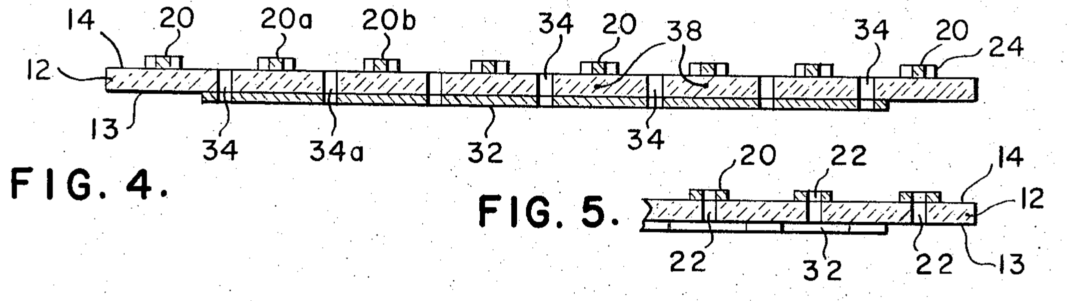
FIGS. 4 and 5 are sectional views on lines 4—4 and 5—5 in FIG. 3, respectively.

As shown in FIG. 3, the crossover or superimposition points between the mutually perpendicular conductive strips 20 and 32 are designated as 38. The body itself of the dielectric sheet 12 is imperforated at the crossover points 38 but it is perforated at and through selected ones or all of the perforations 22 and 34, respectively. Accordingly, in my invention, each perforation in sheet 12 lies between two adjacent superimposed conductive strips. For example, a particular perforation 22*a* on face 14 lies between two adjacent particular strips 32*a* and 32*b* on face 13. Similarly, a particular perforation 34*a* on face 13 lies between two adjacent particular strips 20*a* and 20*b* on face 14.

The diameter of each perforation is less than the spacing between two adjacent parallel strips so that if a wire, for example, were inserted into say perforation 34*a* it would be electrically insulated from the adjacent pair of parallel strips 20*a* and 20*b*.

It will be appreciated that if the perforations in sheet 12 were at the crossover points 38, the insertion of such a wire into such a perforation at a crossover point would establish a conductive path between the two particular perpendicular strips at the crossover point.

Figure 6:
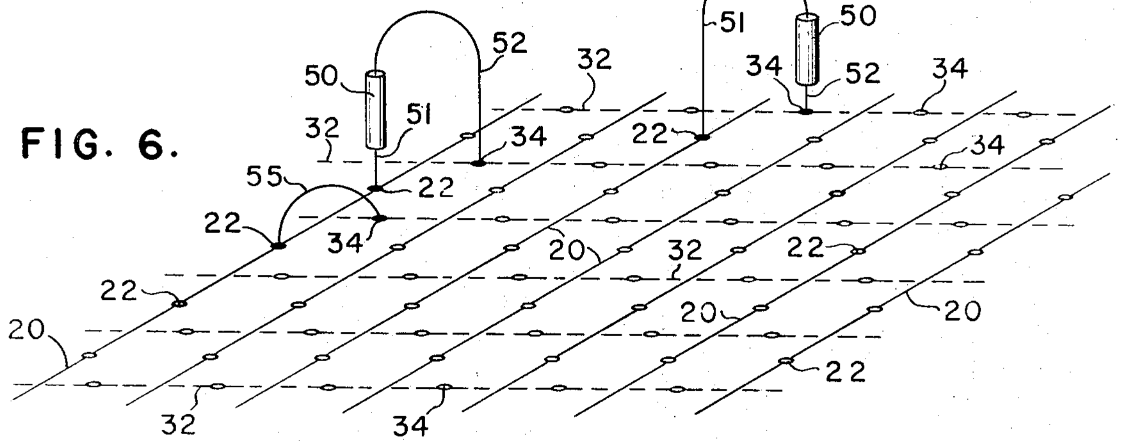
FIG. 6 illustrates a typical manner of mounting components on one side of the P-C board of FIG. 1.

With reference now to FIG. 6, suppose it is desired to mount a resistor 50 having two end leads 51 and 52 on the front face 14 of the P-C board 10. Lead 51 would be inserted into a perforation 22 and subsequently soldered thereto, and lead 52 would be inserted into a perforation 34 and subsequently soldered thereto. It will be appreciated that the insertion of lead 51 into perforation 22 does not establish a conductive path between any overlying strip 20 and any underlying cross-strip 32.

In other words, the insertion of a lead wire from a component or the insertion of a plug into any perforation 22 or 34 of the P-C board of this invention does not automatically establish a conductive path between a pair of cross-strips on the opposite faces of the board. When such an effect is desired, an electric conductor or jumper 55 is soldered between two perforations 22 and 34, as shown in FIG. 6.

The conductive strips may be formed from any suitable conductive materials and normally they are strips from a plating of copper on the opposite surfaces of the dielectric board 12. The strips may be continuous throughout their length or discontinuous at one or more points along their length, depending on the application desired. Conventional techniques may be used to form such discontinuities. The conductive strips may be composed of nickel or nickel plated copper and of other similar metals.

As previously mentioned, while in the preferred embodiment the conductive strips lie in parallel planes and at right angles to each other, it will be recognized that the strips may be placed at some angle other than 90° for example, between 45° and 90°.

Isle 26 which is formed by a convergence of strips 20, as shown, can accept integrated circuit modules whose input and output leads are welded or soldered to the pads of the isle.

Figure 7:
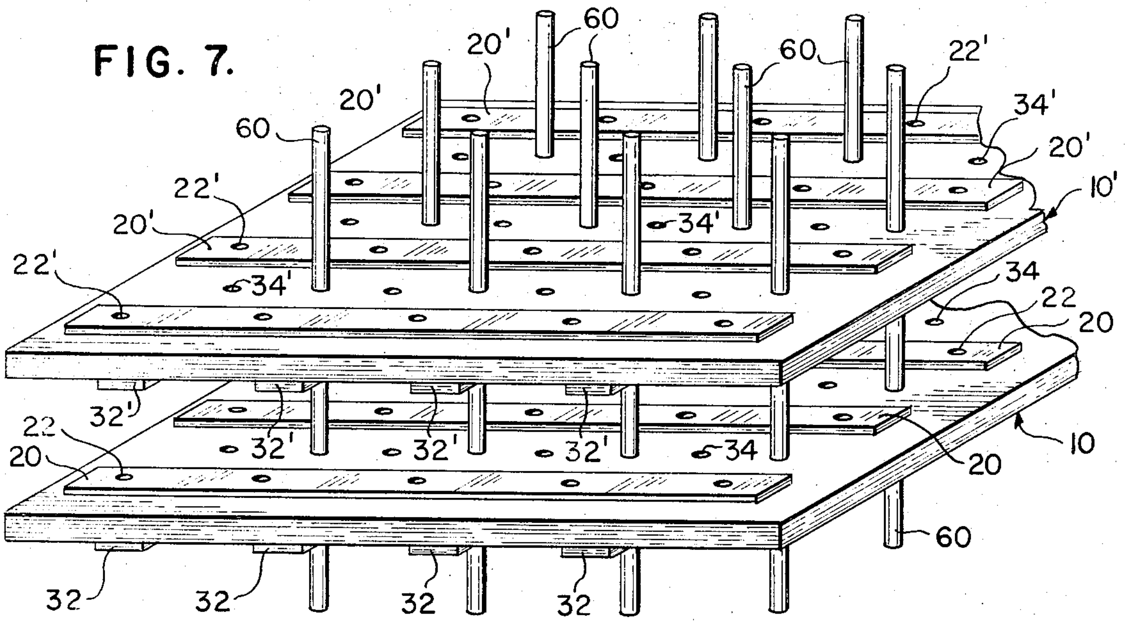
FIG. 7 shows a three-dimensional P-C board structure also in accordance with the invention.

Two universal P-C boards 10, and 10′ can be stacked vertically, as shown in FIG. 7, on a group of vertical conductors 60 which are substantially parallel to each other. Each conductor 60 extends through P-C board 10 between a pair of adjacent overlying strips 20 and a pair of adjacent underlying cross-strips 32. Mutually perpendicular strips 20, 32 and conductors 60 form a three-dimensional matrix whose boards 10, 10′ are again imperforate at the crossover points between strips 20, 32 on one hand, 20′, 32′ on the other hand, and conductors 60. The components and strips from P-C board 10 can be connected via conductors 60 to the components and strips on P-C board 10′.

One method of fabricating universal printed circuit boards as above described consists of first cladding both sides of the dielectric sheet 12 with two layers of a suitable conductive material. The surfaces of these two layers are then coated with a suitable photo-resistant material which is exposed by light focussed through a photographic negative corresponding to the desired layout. The exposed double-cladded dielectric member is then immersed in a suitable etching bath which removes those areas of the photo-resist layers which were not exposed to light, thereby leaving the desired potentially perforated conductive strips on the opposite faces of the dielectric sheet. The holes through the body of the dielectric material itself can be made before it is cladded with the conductive material, or these perforations can be made subsequent to the "printing" of the conductive circuit arrays. Also, the holes in the dielectric body can be made through all of the perforations in the cross-strips matrix or only through selected ones. In practice, the dielectric body has a hole at and through each perforation in each conductive strip.

Figure 8:
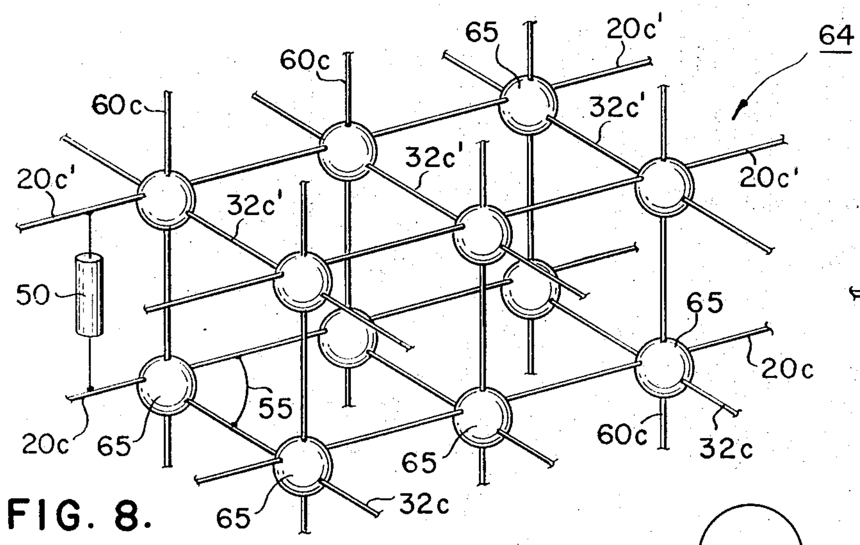
FIG. 8 shows a three-dimensional matrix in accordance with the invention.
Figure 9:
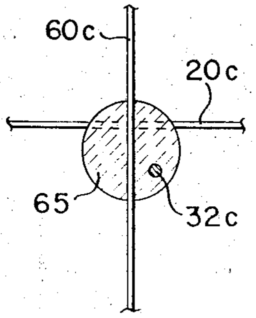
FIG. 9 is a partial sectional view of the matrix of FIG. 8.

While the three-dimensional P-C board structure shown in FIG. 7 is based upon using conventional dielectric sheets 12, it is possible to eliminate these sheets in a three-dimensional matrix, generally designated as 64, and shown in FIGS. 8–9.

In matrix 64 mutually perpendicular conductors 20*c*, 32*c* and 60*c* are supported at their crossover or superimposition points by solid dielectric spheres 65. Thus, conductors 20*c*, 32*c* and 60*c* are electrically insulated from each other. Electric components can be interconnected therebetween as shown with component 50 and wire 55. Matrix 64 is particularly adapted for programming integrated-circuit networks.

Figure 11:
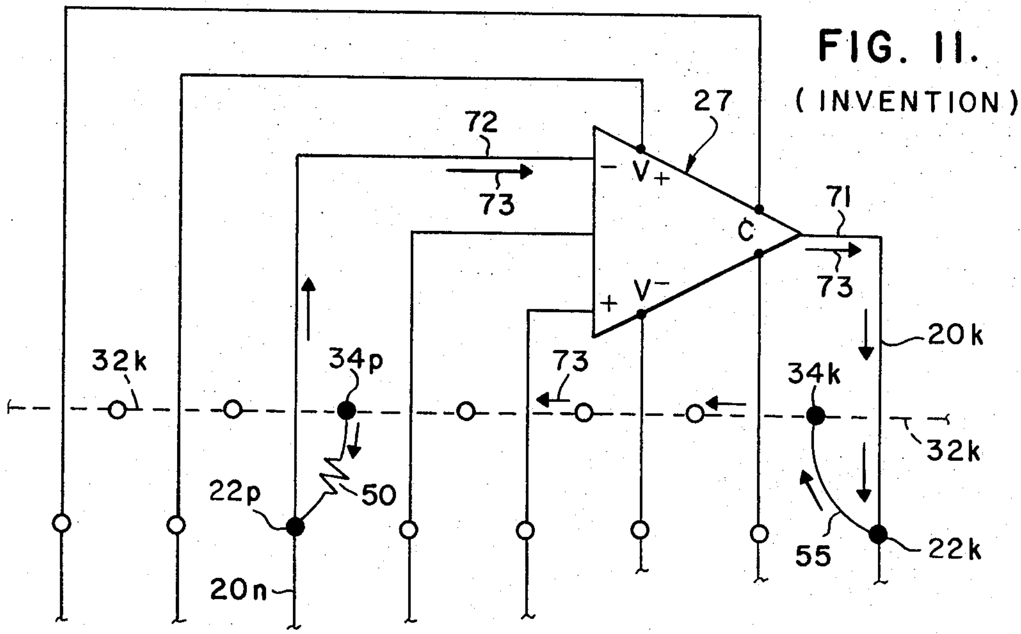
FIG. 11 shows the manner of mounting the standard amplifier on the P-C board of the invention.
Figure 10:
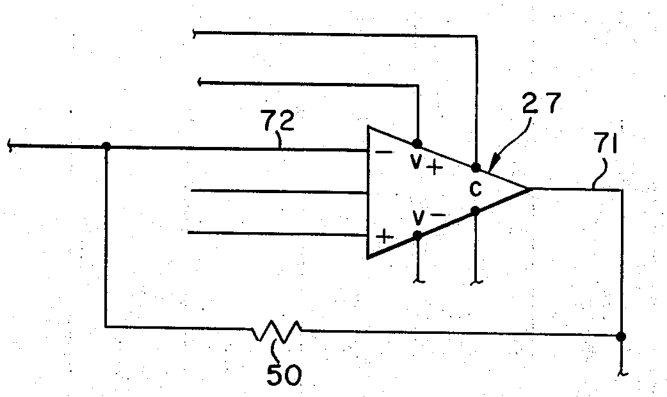
FIG. 10 shows a standard amplifier network.
Figure 12:
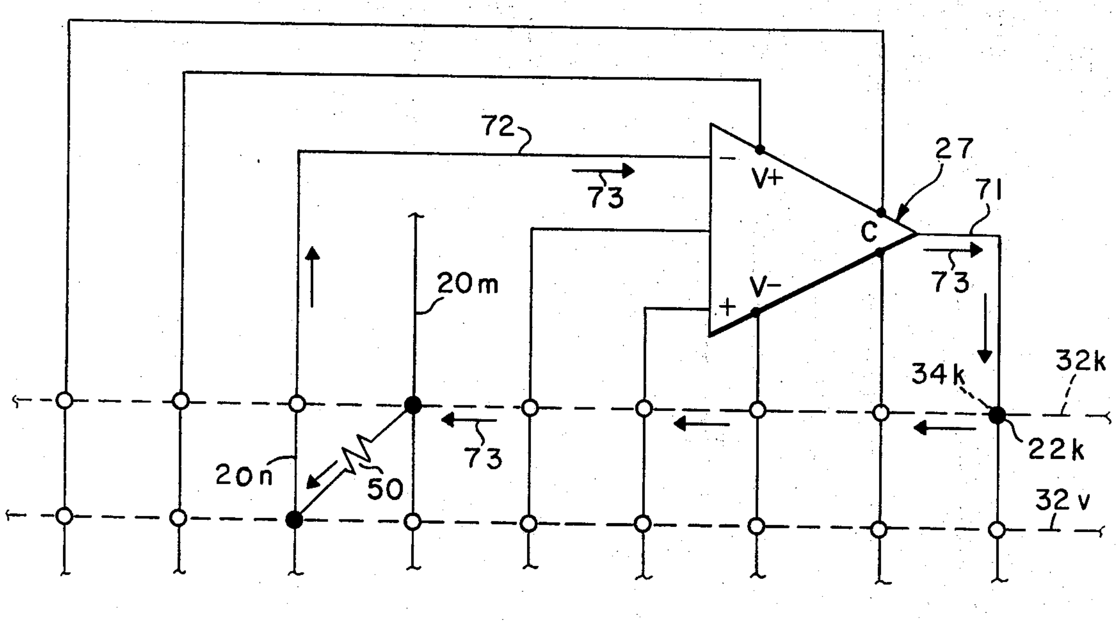
FIG. 12. (PRIOR ART)
FIG. 12 shows the manner of mounting the standard amplifier on a prior art universal P-C board.

The advantages of this invention will become readily apparent from the illustrations shown in FIGS. 10–12 when considered together with FIGS. 1–2.

Suppose it is desired to mount an operational amplifier 27 having input and output leads, as shown in FIG. 10, and to connect a resistor 50 between the amplifier's output lead 71 and one of its input leads 72. This can be accomplished wih the P-C board 10 as shown in FIG. 11 by connecting lead 71 to a strip 20*k*, by jumping strip 20*k* to strip 32*k* with a jumper 55, inserted between perforations 22*k* and 34*k*, and by connecting resistor 50 between perforation 34*p* on strip 32k and between perforation 22*p* on strip 22*n*. The flow of current is indicated by the arrows 73.

On a prior art universal P-C board as shown in FIG. 12, the crossover points are perforated, so that perforations 22 and 34 are superimposed. The layout for amplifier 27 on the prior art board will be apparent from the drawing.

A comparison of FIGS. 11 and 12 will reveal that whereas for the example given, the P-C board of this invention employs only one "uncommitted" bottom strip 32*k*, the prior art board requires two uncommitted bottom strips 32*k*, 32*v* and one uncommitted top strip 20*m*.

Thus the P-C board of this invention requires a minimum of strips and can provide therefore maximum component packaging density.

While this invention has been described with great specificity, it will be apparent to those skilled in the art that modifications will readily suggest themselves all falling within the scope of the claims attached hereto:

What is claimed is:

1. A universal matrix adaptable for programming electric circuits, said matrix comprising:

non-conductive support means supporting at least three groups of spaced-apart electric conductors in superimposed relation, said groups including:

a first group of substantially parallel-spaced conductors;

a second group of substantially parallel-spaced conductors, the conductors of said first group being substantially perpendicular to the conductors of said second group;

a third group of spaced apart conductors in superimposed relation to said first and second groups, the conductors of said third group being substantially perpendicular to the conductors of said first and second groups; and said support means electrically insulating the conductors of each group from the conductors of each other group without providing a conductive path at their points of superimposition.

2. An electronic network comprising in combination:

1. a printed circuit board having a non-conductive dielectric member supporting groups of spaced-apart electric conductors in superimposed relation, said groups including:

a first group of substantially parallel-spaced conductive strips contiguous with the upper face of said member, a second group of substantially parallel-spaced conductive strips contiguous with the bottom face of said member, the strips of said second group being disposed at an angle to the strips of said first group, each conductive strip of each group having a plurality of longitudinally-spaced apart perforations, each perforation in a conductive strip of one group lying between an adjacent pair of conductive strips in the other group, and 2. a plurality of impedances electrically connected between certain perforations of said one group and certain perforations of said other group.

3. The matrix of claim 2 wherein said angle is substantially a right angle.

4. The matrix of claim 2 wherein said dielectric member having perforations in alignment with selected perforations in selected conductive strips in each of said first and second groups.

5. A universal matrix board adapted for programming a plurality of circuit networks, said matrix board comprising:

a non-conductive dielectric member supporting groups of spaced apart electric conductors in superimposed relation, said groups including:

a first group of substantially parallel-spaced conductive strips contiguous with the upper face of said member, a second group of substantially parallel-spaced conductive strips contiguous with the bottom face of said member, the strips of said second group being disposed at an angle to the strips of said first group, each conductive strip of each group having a plurality of longitudinally-spaced apart perforations, each perforation in a conductive strip of one group lying between an adjacent pair of conductive strips in the other group, and said dielectric member supports a third group of substantially parallel-spaced conductors, the conductors of said third group being substantially perpendicular to the conductive strips of said first and second groups, and each conductor in said third group extending from an area lying between an adjacent pair of conductive strips in said first group and an adjacent cross pair of conductive strips in said second group.

6. The matrix of claim 5 and further including:

another dielectric member comprising: a first group of substantially parallel-spaced conductive strips on one face thereof; a second group of substantially parallel-spaced conductive strips on the opposite face thereof, the strips of said second group being disposed at an angle to the strips of said first group; each conductive strip of each group defining a plurality of longitudinally-displaced perforations, each perforation in a conductive strip of one group lying between an adjacent pair of strips in the other group; and each conductor of said third group extending between an adjacent pair of conductive strips in said first group and between an adjacent superimposed pair of conductive strips in said second group on said another member.

7. The matrix of claim 6 wherein said another dielectric member having perforations in alignment with selected perforations in selected conductive strips in each of said first and second groups on said another member.

* * * * *